United States Patent
Guérin et al.

(10) Patent No.: US 9,501,769 B2
(45) Date of Patent: Nov. 22, 2016

(54) MOBILE PAYMENT SOLUTION FOR SELF-SERVICE MULTI-FUNCTION PRINTER

(71) Applicant: Xerox Corporation, Norwalk, CT (US)

(72) Inventors: Nicolas Guérin, Notre Dame de Mésage (FR); Saghar Estehghari, La Tronche (FR)

(73) Assignee: Xerox Corporation, Norwalk, CT (US)

(*) Notice: Subject to any disclaimer, the term of this patent is extended or adjusted under 35 U.S.C. 154(b) by 174 days.

(21) Appl. No.: 14/463,827

(22) Filed: Aug. 20, 2014

(65) Prior Publication Data
US 2016/0055477 A1 Feb. 25, 2016

(51) Int. Cl.
| | |
|---|---|
| *G06Q 20/00* | (2012.01) |
| *G06Q 20/28* | (2012.01) |
| *G06Q 20/20* | (2012.01) |
| *G06Q 20/14* | (2012.01) |
| *G06Q 20/40* | (2012.01) |
| *G06Q 20/32* | (2012.01) |
| *G06Q 20/34* | (2012.01) |
| *G07F 7/02* | (2006.01) |
| *G07F 17/00* | (2006.01) |

(52) U.S. Cl.
CPC ............ *G06Q 20/28* (2013.01); *G06Q 20/145* (2013.01); *G06Q 20/202* (2013.01); *G06Q 20/32* (2013.01); *G06Q 20/342* (2013.01); *G06Q 20/40* (2013.01); *G07F 7/025* (2013.01); *G07F 17/0021* (2013.01)

(58) Field of Classification Search
CPC ....... G06Q 20/00; G06Q 40/00; G06Q 30/06
USPC .......................................... 705/17, 18, 38, 39
See application file for complete search history.

(56) References Cited

U.S. PATENT DOCUMENTS

| | | | |
|---|---|---|---|
| 8,600,899 B1 | 12/2013 | Davis | |
| 8,639,619 B1 | 1/2014 | Priebatsch | |
| 9,195,981 B2 * | 11/2015 | Annan | G06Q 20/32 |

(Continued)

FOREIGN PATENT DOCUMENTS

| | | | |
|---|---|---|---|
| WO | 2014021825 A1 | | 2/2014 |
| WO | WO 2014/021825 | * | 2/2014 |
| WO | 2014037923 A1 | | 3/2014 |

OTHER PUBLICATIONS http://w3.efi.com/products/self-serve, Aug. 18, 2014, p. 1.

(Continued)

*Primary Examiner* — Rokib Masud
(74) *Attorney, Agent, or Firm* — Gibb & Riley, LLC

(57) ABSTRACT

A system and method incorporating a multi-function printer (MFP), a mobile device and a server to effect payment of MFP services. The MFP generates and displays a session prepayment code containing identification information for the MFP and for a specific session initiated by a user. The code is entered into the mobile device and the mobile device transmits it to the server. In response, the server transmits a menu of MFP functions and costs to the mobile device, allowing the user to estimate and prepay the cost of the specific session through a service accessible on the mobile device. Once proof of prepayment is received, the server transmits an authorization code to the mobile device and the user inputs it into the MFP. The MFP verifies the authorization code with the server and performs user-selected functions until a time allotted for the specific session ends or until available credit is used, whichever comes first.

14 Claims, 6 Drawing Sheets

(56) References Cited

U.S. PATENT DOCUMENTS

| | | |
|---|---|---|
| 2006/0004672 A1 | 1/2006 | Leute |
| 2006/0293966 A1 | 12/2006 | Inouye |
| 2007/0035762 A1 | 2/2007 | Wilsher et al. |
| 2010/0196075 A1 | 8/2010 | Tredoux et al. |
| 2010/0312721 A1 | 12/2010 | Terada et al. |
| 2012/0054046 A1* | 3/2012 | Albisu ................ G06Q 20/20 705/16 |
| 2013/0021638 A1* | 1/2013 | Hong .................. G06F 3/1204 358/1.14 |
| 2013/0035787 A1 | 2/2013 | Canter |
| 2013/0135665 A1 | 5/2013 | Griffith et al. |
| 2013/0139218 A1 | 5/2013 | Roulland et al. |
| 2013/0167208 A1 | 6/2013 | Shi |
| 2013/0282588 A1* | 10/2013 | Hruska ................ G06Q 20/10 705/67 |
| 2014/0058951 A1 | 2/2014 | Kuppuswamy |
| 2014/0067511 A1 | 3/2014 | Froes et al. |
| 2014/0172531 A1 | 6/2014 | Liberty et al. |

OTHER PUBLICATIONS http://w3.efi.com/products/self-serve/m500, Aug. 18, 2014, pp. 1-2.
http:/lask.van.fedex.com/learn/print-and-go-usb, Aug. 18, 2014, pp. 1-2.
http://www.equitrac.com/downloads/Equitrac-Pay-Stations.pdf, Aug. 18, 2014, pp. 1-2.
http://www.equitrac.com/pr04162009.html, Aug. 18, 2014, pp. 1-2.

* cited by examiner

MOBILE PAYMENT SOLUTION FOR SELF-SERVICE MULTI-FUNCTION PRINTER

BACKGROUND

The system, devices and methods disclosed herein generally relate to point of sale (POS) payment for services provided by self-service multi-function printers and, more particularly, to effecting POS payment for services provided by a self-service multi-function printer using a mobile device, such as a smartphone.

Self-service multi-function printers (also referred to herein as self-service all-in-one printers or print kiosks) with point of sale (POS) payment solutions have been developed to allow the general public to pay for and receive a variety of document services provided by such printers. Such self-service multi-function printers are typically deployed in locations accessible to the general public including, but not limited to, libraries, colleges, universities, hotels, airports and office supplies stores. The document services provided by such self-service multi-function printers can include, but are not limited to, copying, printing, scanning, faxing, and emailing of documents. Currently, the POS payment solutions for these self-service multi-function printers require the presence of a clerk to process the POS payment or require hardware for specific payment systems (e.g., processing machines for cash, including coins and banknotes; processing machines for checks; processing machines for various cards, including, but not limited to credit cards, debit cards, pre-paid cards, etc.). While such POS payment solutions are effective, the additional hardware required can be costly. Furthermore such POS payment solutions are not always convenient for the user. For example, the user may have to wait for an available clerk or may not have the correct amount of cash required and/or may not have the correct type of credit, debit, or pre-paid card required.

SUMMARY

In view of the foregoing, disclosed herein is a system that incorporates a self-service multi-function printer (MFP), a mobile device (e.g., a smartphone) and a management and accounting server in communication with both the MFP and the mobile device in order to effect point of sale (POS) payment of services provided to a user by the MFP. In the disclosed system, a MFP displays a session prepayment code (e.g., a matrix barcode or other image code or an alphanumeric code) that contains coded identification information for both the MFP and the user-initiated specific session of operation of the MFP. The user can enter the code into the mobile device (e.g., by scanning it in using a camera of the mobile device or manually keying it in, as appropriate) and can transmit it to the server using the mobile device. Based on the code, the server can transmit a menu of MFP functions and associated costs back to the mobile device so that the user can estimate the cost of and prepay for the specific session, using an online payment service that is accessible through the mobile device. Once the server receives proof of prepayment from the user using the mobile device, the server can generate and transmit a use authorization code to the mobile device and this code can be input by the user into the MFP. The MFP can communicate with the server to verify the validity of the use authorization code and can perform user-selected functions until the user terminates the specific session, until a time period allotted for the specific session ends or until all available credit is used, whichever comes first. Optionally, to enhance system security, communications between the various components can be encrypted. Also disclosed herein are the unique components used to implement such a system (e.g., a MFP, a mobile device and a management and accounting server) and the methods of operating those components in an integrated manner and, thereby a method of operating the system as a whole.

More specifically, disclosed herein is a system that incorporates a self-service multi-function MFP (MFP), a mobile device (e.g., a smartphone) of a user that is separate from the printer and a management and accounting server that is separate from and in communication with both the MFP and the mobile device in order to effect point of sale (POS) payment of services provided to a user by the MFP. This system can comprise a first application operating on the MFP, a second application operating on the mobile device; and, a third application operating on the server.

The first application can cause the MFP to display a session prepayment code for a specific session of operation of the MFP by the user. This session prepayment code can contain coded information and, particularly, coded identification information for both the MFP and the specific session. For example, this coded identification information can contain the MFP serial number and a randomly generated session number. In any case, the session prepayment code can comprise, for example, a machine-readable image code (e.g., matrix barcode, a simple barcode, or any other suitable machine-readable image code) or an alphanumeric code or other suitable character string code.

The mobile device can receive the session prepayment code. For example, if the session prepayment code comprises a machine-readable image code, the session prepayment code can be scanned into the mobile device using a camera of the mobile device. Alternatively, if the session prepayment code comprises an alphanumeric code or other type of character string code, the user can visually read the session prepayment and can manually key it into the mobile device. Alternatively, a short-range wireless communication link could be established between the mobile device and the MFP in order to allow the session prepayment code to be transmitted directly from the specific MFP to the mobile device. In response, the second application can cause the mobile device to communicate the session prepayment code to the server.

The server can receive the session prepayment code from the mobile device and, in response, the third application can cause the server to use the session prepayment code to access a function-cost menu listing functions of the MFP and costs for the functions and can further cause the server to communicate the function-cost menu to the mobile device.

The mobile device can receive the function-cost menu from the server and, in response, the second application can cause the mobile device to display the function-cost menu in order to allow the user to estimate an amount required for prepayment for the specific session. That is, the second application can allow the user to effect prepayment for the specific session of operation of the printer using an on-line payment service and can further cause the mobile device to communicate proof of that prepayment to the server.

The server can receive the proof of the prepayment from the mobile device and, in response, the third application can cause the server to generate a use authorization code for the specific session of operation of the MFP by the user and to communicate the use authorization code to the mobile device.

The mobile device can receive the use authorization code from the server and, in response, the second application can cause the mobile device to display the use authorization code so as to allow the user to read the use authorization code and to manually enter the use authorization code into the MFP. Alternatively, the second application can wirelessly communicate the use authorization code directly to the MFP.

In any case, the MFP can receive the use authorization code and, in response, the first application can allow the MFP to be used by the user during the specific session. Specifically, the first application can cause the MFP to communicate with the server in order to verify the validity of the use authorization code and to determine a value of available credit associated with the use authorization code. Once the validity of the use authorization code is verified and the value of available credit is determined, the first application can cause the MFP to display a menu of selectable functions of the MFP. When a selection of a specific function is received and when the value of the available credit is at least as high as a specific cost associated with the specific function selected, the first application can cause the MFP to perform the specific function. However, when the value of the available credit is less than the specific cost associated with the specific function, the first application can cause the MFP to prohibit performance of the specific function.

It should be noted that the use authorization code can be generated such that it only authorizes use of the MFP by the user during the specific session, such that it only authorizes use of the MFP by the user as long as credit is available and such that it limits the specific session to a specific time period. Thus, termination of the specific session of operation of the printer can occur when the user terminates the specific session, when available credit is used, or when a time period allotted for the specific session ends, whichever comes first.

Also disclosed herein is a method of operating the above-described system, which incorporates a self-service multi-function MFP (MFP), a mobile device (e.g., a smartphone) of a user that is separate from the printer and a management and accounting server that is separate from and in communication with both the MFP and the mobile device in order to effect point of sale (POS) payment of services provided to a user by the MFP.

This method can comprise causing the MFP to display a session prepayment code for a specific session of operation of the MFP by the user. This session prepayment code can contain coded information and, particularly, coded identification information for both the MFP and the specific session. For example, this coded identification information can contain the MFP serial number and a randomly generated session number. In any case, the session prepayment code can comprise, for example, a machine-readable image code (e.g., matrix barcode, a simple barcode, or any other suitable machine-readable image code) or an alphanumeric code or other suitable character string code.

In the method, the session prepayment code can be received by the mobile device. For example, if the session prepayment code comprises a machine-readable image code, the session prepayment code can be scanned into the mobile device using a camera of the mobile device. Alternatively, if the session prepayment code comprises an alphanumeric code or other type of character string code, the user can visually read the session prepayment and can manually key it into the mobile device. Alternatively, a short-range wireless communication link could be established between the mobile device and the MFP in order to allow the session prepayment code to be transmitted directly from the specific MFP to the mobile device.

Next, the method can comprise causing the mobile device to communicate the session prepayment code to the server, causing the server to use the session prepayment code to access a function-cost menu listing functions of the MFP and costs for the functions and further causing the server to communicate the function-cost menu to the mobile device.

The method can also comprise causing the mobile device to display the function-cost menu in order to allow the user to estimate an amount required for prepayment for the specific session, allowing the user to effect prepayment for the specific session of operation of the printer using an on-line payment service accessible through the mobile device and causing the mobile device to communicate proof of that prepayment to the server.

The method can further comprise causing the server to generate, in response to the proof of prepayment, a use authorization code for the specific session of operation of the MFP by the user and to communicate that use authorization code to the mobile device.

The method can further comprise causing the mobile device to display the use authorization code so as to allow the user to read the use authorization code and to manually enter the use authorization code into the MFP. Alternatively, method can comprise causing the mobile device to wirelessly communicate the use authorization code directly to the MFP.

In any case, the method can further comprise, in response to receiving the use authorization code, allowing the MFP to be used by the user during the specific session. Specifically, the method can comprise causing the MFP to perform the following: communicate with the server in order to verify the validity of the use authorization code and to determine a value of available credit associated with the use authorization code; once the validity of the use authorization code is verified and the value of available credit is determined, display a menu of selectable functions of the MFP; and, when a selection of a specific function is received and when the value of the available credit is at least as high as a specific cost associated with the specific function selected, perform the specific function. The method can further comprise, when the value of the available credit is less than the specific cost associated with the specific function, causing the MFP to prohibit performance of the specific function.

It should be noted that in the method the use authorization code can be generated such that it only authorizes use of the MFP by the user during the specific session, such that it only authorizes use of the MFP by the user as long as credit is available and such that it limits the specific session to a specific time period. Thus, termination of the specific session of operation of the printer can occur when the user terminates the specific session, when available credit is used, or when a time period allotted for the specific session ends, whichever comes first.

These and other features are described in, or are apparent from, the following detailed description.

BRIEF DESCRIPTION OF THE DRAWINGS

The disclosed system, devices and methods are described in detail below with reference to the drawings, which are not necessarily drawn to scale and in which.

DETAILED DESCRIPTION

As mentioned above, self-service multi-function printers (also referred to herein as self-service all-in-one printers or print kiosks) with point of sale (POS) payment solutions have been developed to allow the general public to pay for and receive a variety of document services provided by such printers. Such self-service multi-function printers are typically deployed in locations accessible to the general public including, but not limited to, libraries, colleges, universities, hotels, airports and office supplies stores. The document services provided by such self-service multi-function printers can include, but are not limited, copying, printing, scanning, faxing, and emailing of documents. Currently, the POS payment solutions for these self-service multi-function printers require the presence of a clerk to process the POS payment or require hardware for specific payment systems (e.g., processing machines for cash, including coins and banknotes; processing machines for checks; processing machines for various cards, including, but not limited to credit cards, debit cards, pre-paid cards, etc.). While such POS payment solutions are effective, the additional hardware required can be costly. Furthermore such POS payment solutions are not always convenient for the user. For example, the user may have to wait for an available clerk or may not have the correct amount of cash required and/or may not have the correct type of credit, debit, or pre-paid card required.

Figure 1:
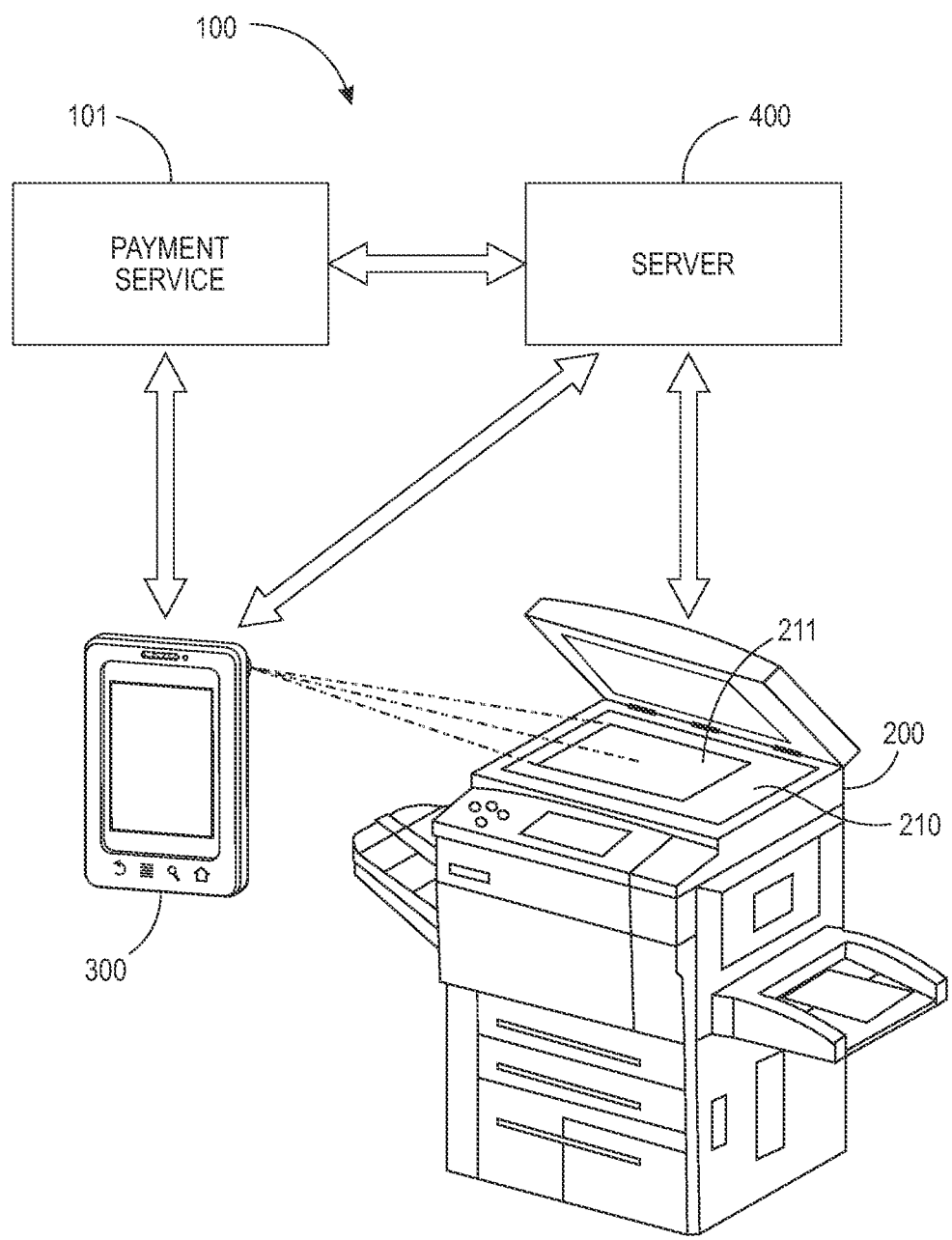
FIG. 1 is a schematic diagram illustrating a system that incorporates a multi-function printer (MFP), a mobile device of a user and server to effect point of sale (POS) payment of services provided to the user by the MFP.

Referring to FIG. 1, disclosed herein is a system 100 that incorporates at least one specific self-service multi-function printer (MFP) 200, a mobile device 300 of at least one specific user and a management and accounting server 400 in communication (e.g., over a wireless telecommunication network, such as 3G or 4G wireless telecommunication network or a local area telecommunication network) with both the specific MFP 200 and the mobile device 300 in order to effect point of sale (POS) payment of services provided to the specific user by the specific MFP 200 during a specific session of operation of the MFP 200.

For purposes of this disclosure, the term "multi-function printer (MFP)" (also referred to herein as an all-in-one printer) refers to a computerized printing machine that incorporates the functionality of multiple devices in a document management and production environment. That is, the machine contains multiple functional components including hardware components (such as a scanner and one or more print engines) and software components that are configured alone and/or in combination to perform multiple different document management and production functions. These document management and production functions can include, but are not limited to, scan functions, print functions, facsimile (FAX) functions, copy functions, document storage functions, and electronic mail (e-mail) functions. Such functions are well known in the art and, thus, the details have been omitted from this specification in order to allow the reader to focus on the salient aspect of the disclosed system, devices and methods.

Additionally, the term "mobile device" refers to a relatively small, portable computerized device that can be readily carried by a user. Oftentimes such mobile devices are referred to as handheld devices or handheld computers or portable computers and any of the following are exemplary mobile devices: smartphones, personal digital assistances (PDAs), smartwatches, handheld game systems, tablet computers and laptop computers. It should be understood that this listing of exemplary mobile devices is not intended to be limiting.

Generally, in the disclosed system 100, a specific user can initiate a specific session of operation of a specific MFP 200 and, in response, the specific MFP 200 can display a session prepayment code (e.g., a matrix barcode or other image code; an alphanumeric code; or any other type of suitable code) that contains coded information and, particularly, coded identification information for both the specific MFP 200 and the user-initiated specific session of operation of that specific MFP 200. The user can enter the session prepayment code into the mobile device 300 (e.g., by scanning it in using a camera on the mobile device 300 or by manually keying it in, as appropriate) and can then transmit that session prepayment code to the server 400 using his/her mobile device 300.

Based on the session prepayment code, the server 400 can transmit a function-cost menu for the specific MFP 200 (i.e., a menu of the document management and production functions available through the specific MFP 200 and the associated costs for those functions) to the mobile device 300 so that the user can estimate the overall cost of and prepay for the specific session of operation of the specific MFP 200. Prepayment for the specific session can be made by the user using an online payment service 101, which is accessible through the mobile device 300.

Once the server 400 receives proof of prepayment from the user using the mobile device 300, the server 400 can generate and transmit a use authorization (UA) code to the mobile device 300 and this use authorization (UA) code can be input (e.g., keyed in or otherwise input, as described in greater detail below) by the user into the specific MFP 200. The specific MFP 200 can then communicate with the server 400 to verify the validity of the use authorization (UA) code and determine the value of available credit the user has for the specific session. Once the validity of the use authorization (UA) code is verified and the value of available credit is determined, the specific MFP 200 can perform user-selected functions until the specific session of operation of the specific MFP 200 is terminated (e.g., until the user terminates the specific session, until a time period allotted for the specific session ends or until all available credit is used, whichever comes first).

Optionally, to enhance system security, the communications between specific MFP 200, the mobile device 300 and the management and accounting server 400, described above, can be encrypted. For example, these communications can be encrypted using an asymmetric key encryption scheme.

Using the mobile device 300 of a specific user to effect the POS payment for services in this manner is advantageous because it eliminates the need for the presence of a clerk to process the POS payment or additional hardware for specific payment systems.

For illustration purposes, this system 100 is shown in FIG. 1 operating with only one specific MFP 200 and one mobile device 300 of one specific user. However, it should be understood that the management and accounting server 400 could be configured so that the system 100 can operate with any number of one or more MFPs, each with their own specific document management and production functions and costs associated with those function and these MFPs could be used by multiple different users using their respective mobile devices to effect POS payment for services.

Figure 2:
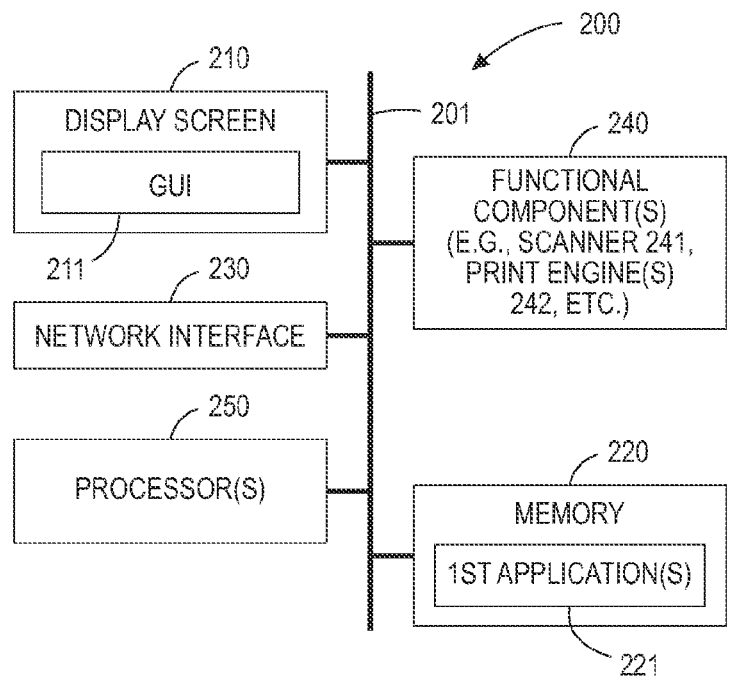
FIG. 2 is a schematic diagram illustrating an exemplary MFP that can be incorporated into the system of FIG. 1.
Figure 3:
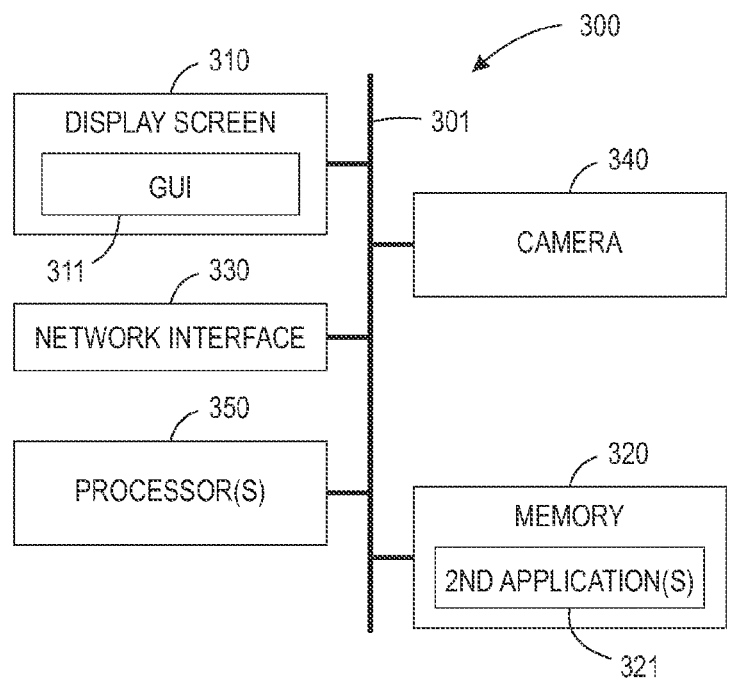
FIG. 3 is a schematic diagram illustrating an exemplary mobile device that can be incorporated into the system of FIG. 1.
Figure 4:
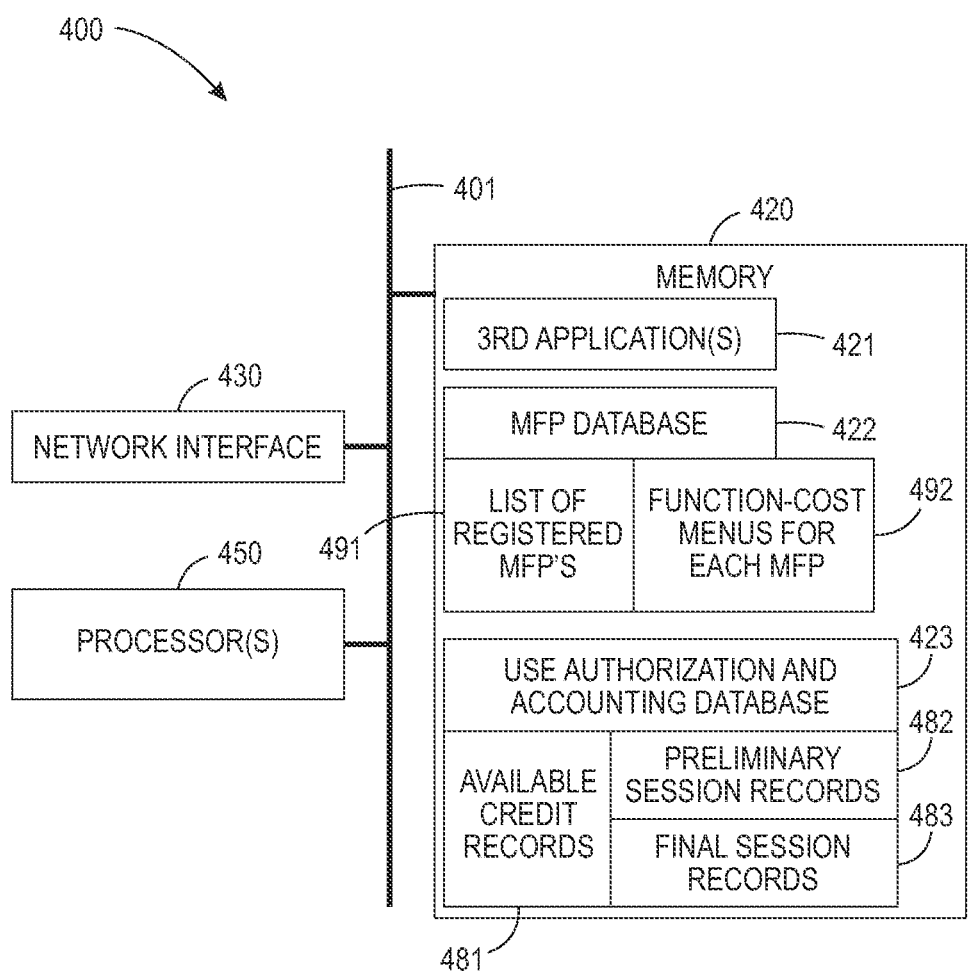
FIG. 4 is a schematic diagram illustrating an exemplary server that can be incorporated into the system of FIG. 1.

Also disclosed herein are the unique components (e.g., a specific self-service MFP 200, a mobile device 300 of a specific user and a management and accounting server 400) used to implement the system 100 of FIG. 1 as well as the methods of operating each of the components in an integrated manner within the system 100 of FIG. 1 and, thereby a method of operating the system 100 as a whole. FIGS. 2, 3 and 4 are schematic diagrams illustrating a self-service multi-function printer (MFP) 200, a mobile device 300 and a management and accounting server 400, respectively, which can be incorporated into the above-described system 100 of FIG. 1.

More specifically, FIG. 2 is a schematic diagram illustrating an exemplary self-service multi-function printer (MFP) 200, which can be incorporated into the above-described system 100 of FIG. 1 in order to allow a mobile device (e.g., a smartphone or other mobile device) to be used for point of sale (POS) payment for services performed by the MFP 200. The MFP 200 can comprise a display screen 210 (e.g., a display or monitor) that displays a graphical user interface (GUI) 211 (i.e., that is adapted to display a GUI, that is configured to display a GUI, etc.). The MFP 200 can further comprise a memory 220, a network interface 230, at least one functional component 240, and one or more processors 250 operably connected to the display screen 210, the memory 220, the network interface 230, and the functional component(s) 240 (e.g., over a system bus 201). At least one first application 221 can operate on the MFP 200. For example, the memory 220 can comprise a computer-readable storage medium. This memory 220 can store at least one first application 221 (e.g., at least one first program of instructions), which is executable by the processor 250 to cause the MFP 200 to perform a method (i.e., a method of operating the MFP 200) and, particularly, various method steps within the method of operating a system 100 as a whole, as described in greater detail below. The network interface 230 can comprise hardware and/or software, which allows the MFP 200 to communicate wirelessly with other computerized devices (e.g., with a management and accounting server 400, as illustrated in FIGS. 1 and 4) over a wireless telecommunication network, such as 3G or 4G wireless telecommunication network or a local area telecommunication network (e.g., a WiFi network). The functional component(s) 240 can comprise, for example, a scanner 241, one or more print engines 242, and any other suitable hardware and/or software components used to perform the document management and production functions described above (e.g., scan functions, print functions, FAX functions, copy functions, document storage functions, e-mail functions, etc.).

FIG. 3 is a schematic diagram illustrating an exemplary mobile device 300, which can be incorporated into the above-described system 100 of FIG. 1 in order to provide point of sale (POS) payment for services performed by a specific multi-function printer (MFP) 200. The mobile device 300 can comprise a camera 340 as well as a display screen 310 that displays a graphical user interface (GUI) 311 (i.e., that is adapted to display a GUI, that is configured to display a GUI, etc.). The mobile device 300 can further comprise a memory 320, a network interface 330, and one or more processors 350 operably connected to the camera 340, the display screen 310, the memory 320, and the network interface 330 (e.g., over a system bus 301). At least one second application 321 can operate on the mobile device 300. For example, the memory 320 can comprise a computer-readable storage medium. This memory 320 can store at least one second application 321 (e.g., at least one second program of instructions, such as a mobile software application), which is executable by the processor 350 to cause the mobile device 300 to perform a method (i.e., a method of operating the mobile device 300) and, particularly, various method steps within the method of operating the system 100 as a whole, as described in greater detail below. The network interface 330 can comprise the hardware and/or software, which allows the mobile device 300 to communicate wirelessly with other computerized devices (e.g., to communicate wirelessly with the server 400 and the payment service 101, as discussed above and illustrated in FIGS. 1 and 4) over a wireless telecommunication network, such as 3G or 4G wireless telecommunication network or a local area telecommunication network (e.g., a WiFi network). This mobile device 300 can comprise smartphone. Alternatively, this mobile device 300 can comprise any other suitable mobile device (e.g., a PDA, smartwatch, handheld game system, tablet computers or laptop computer) configured with the above-described features 310-311, 320-321, 330, 340 and 350.

FIG. 4 is a schematic diagram illustrating an exemplary server 400, which can be incorporated into the above-described system 100 of FIG. 1 to communicate with a specific multi-function printer (MFP) 200 and a mobile device 300 of a specific user in order to facilitate using the mobile device 300 for point of sale (POS) payment for services performed by the specific MFP 200. The server 400 can be a dedicated server or, alternatively, a cloud-based server. In any case, the server 400 can comprise a memory 420, a network interface 430, and at least one processor 450 operably connected to the memory 420 and the network interface 430 (e.g., over a system bus 401 or over a wireless network connection). The memory 420 can store a MFP database 422 and a use authorization and accounting database 423. At least one third application 431 can operate on the server 400. For example, the memory 420 can further store at least one third application 431 (e.g., at least one third program of instructions), which is executable by the processor 450 to cause the server to perform a method (i.e., a method of operating the management and accounting server 400) and, particularly, various method steps within the method of operating the system 100 as a whole, as described in greater detail below. The MFP database 422 can maintain a list of registered MFPs 491 as well as function-cost menus 492 for each of the registered MFPs. The use authorization and accounting database 423 can maintain preliminary and final session records 482-483, which associate a specific session of operation of a specific MFP with a specific user, and credit records 481, which indicate the value of available credit that a specific user has for using a specific MFP during a specific session. The network interface 430 can comprise the hardware and/or software, which allows the server 400 to communicate wirelessly with other computerized devices (e.g., to communicate wirelessly with the specific MFP 200 and the mobile device 300 of a specific user, as discussed above and illustrated in FIG. 1 and FIGS. 2 and 3, respectively) over a wireless telecommunication network, such as 3G or 4G wireless telecommunication network or a local area telecommunication network (e.g., a WiFi network).

Figure 5:
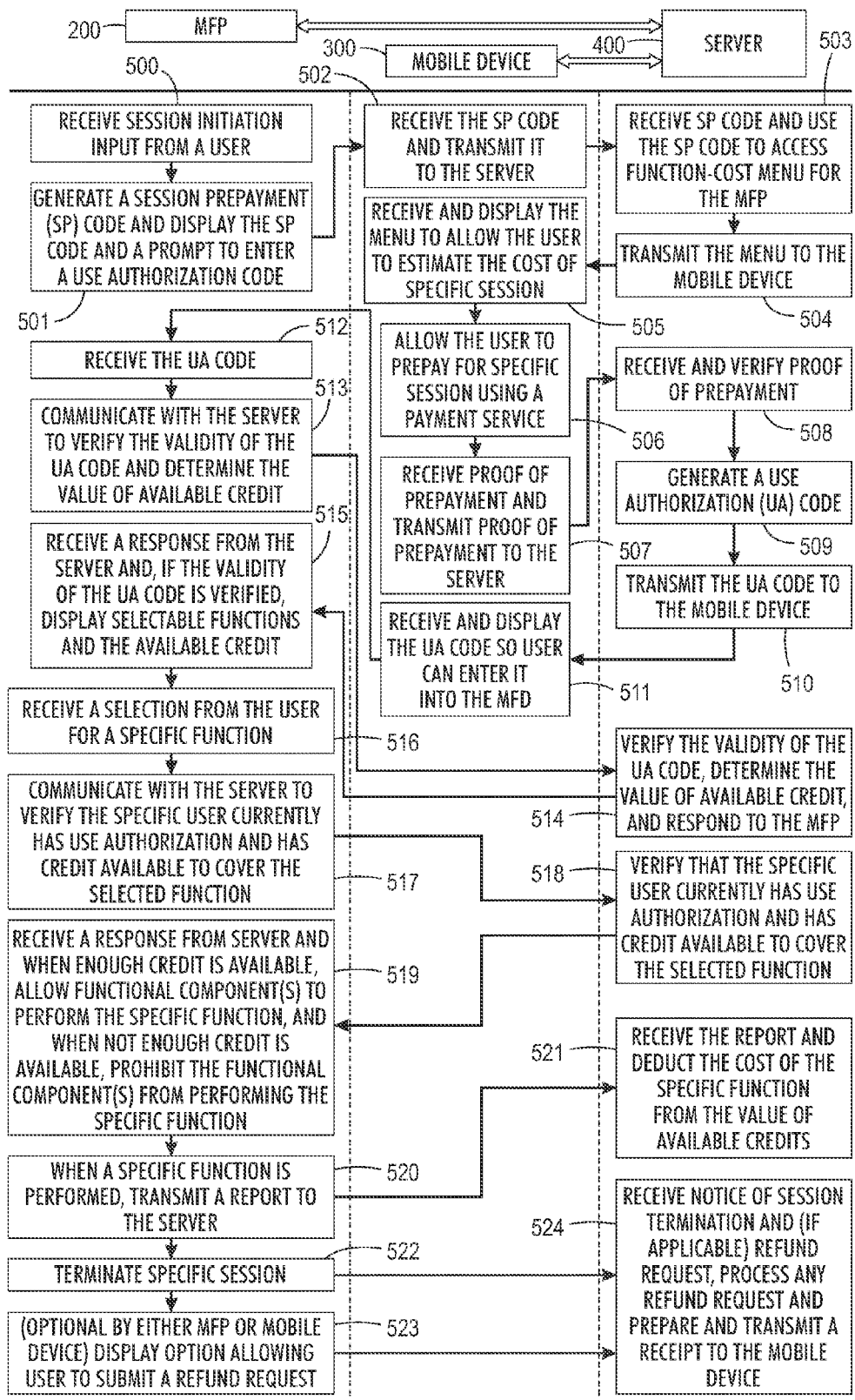
FIG. 5 is flow diagram illustrating a method of operating the system of FIG. 1, including methods of operating a MFP, a mobile device and a server within that system.

FIG. 5 is a flow diagram illustrating methods of operating each of the components (i.e., a specific MFP 200, a mobile device 300 of a specific user and the management and accounting server 400) in an integrated manner within the system 100 of FIG. 1 as caused by the first application(s) 221, second application(s) 321 and third application(s) 421 operating on those components and, thereby the method of operating the system 100 of FIG. 1 as a whole.

Referring to the flow diagram of FIG. 5 in combination with FIGS. 1-4, the method of operating the system 100 can begin with a specific user entering an input (i.e., a session initiation input) into a specific MFP 200 in order to initiate a specific session of operation of that specific MFP 200. Various different techniques can be employed that would allow a user to enter such a session initiation input. For example, the session initiation input can be entered, when the user powers on the MFP 200 or wakes the MFP 200 up from a standby or sleep mode. Alternatively, the session initiation input can be entered through a selectable option on the GUI 211 of the MFP 200 or by simply touching the display screen 210 of the MFP 200, when the display screen 210 is a touch screen. Alternatively, any other suitable technique for entering the session initiation input could be employed.

The method of operating the specific MFP 200 within the system 100 and, thereby the method of operating the system 100 can further comprise receiving the session initiation input from the user (500). In response to receiving the session initiation input from the user, the first application 221 operating on the MFP 200 can cause the MFP 200 to display a session prepayment code 215 and an input prompt 216 for a use authorization code on the GUI 211, as illustrated the exemplary screen-shot shown in FIG. 6 of the GUI 211 (501).

Figure 6:
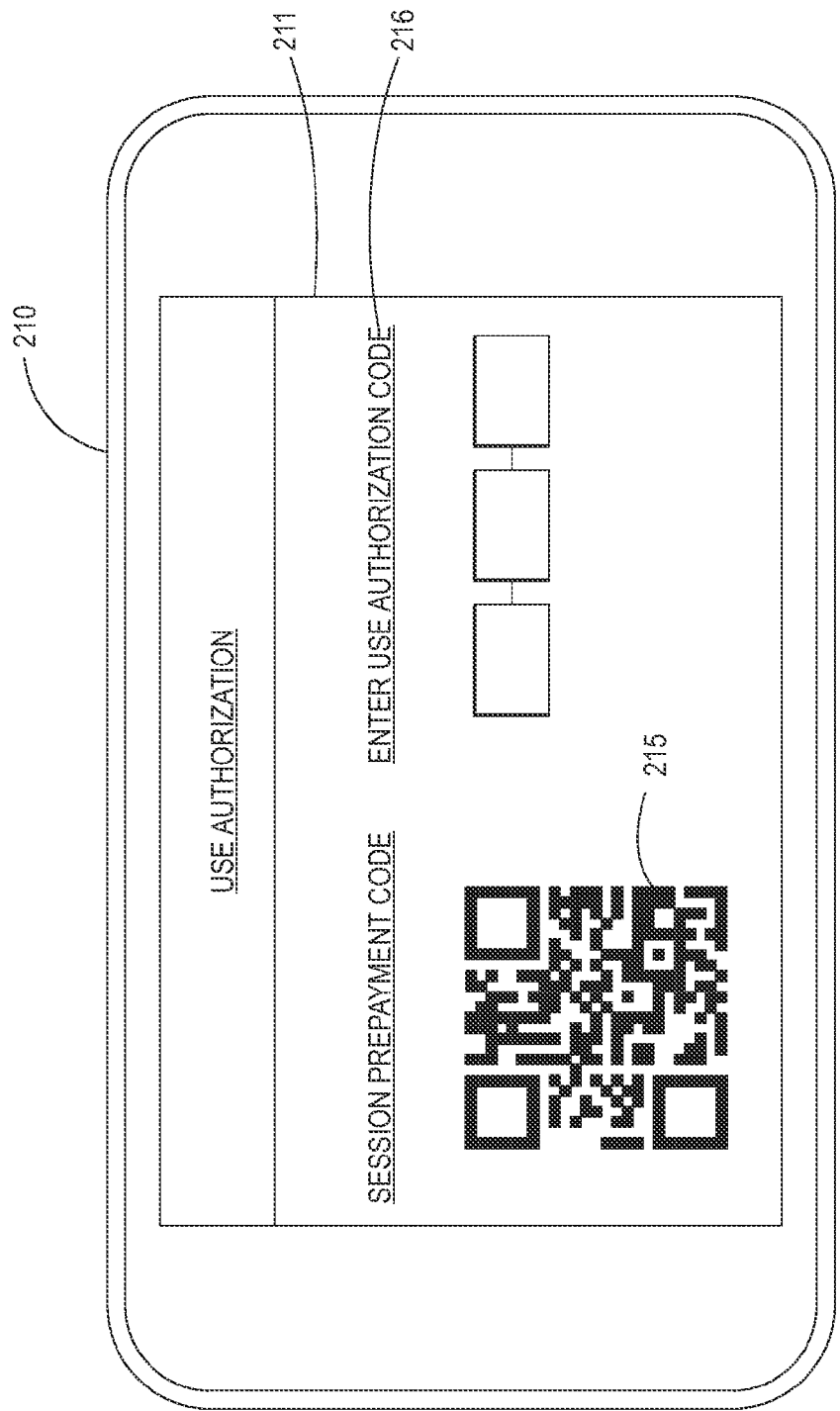
FIG. 6 is an illustration of an exemplary screen shot of a graphic user interface of a MFP displaying a session prepayment code and an input prompt for a use authorization code.

The session prepayment code 215 can comprise a machine-readable code and, particularly, an image code, such as a matrix barcode (e.g., a quick response (QR) code, as illustrated in FIG. 6), a simple barcode or any other suitable image code that is readable by a camera of a mobile device. Alternatively, the session prepayment code 215 can comprise an alphanumeric code or other character string code. In any case, the session prepayment code 215 can contain coded information and, particularly, coded identification information for both the specific MFP 200 and for the user-initiated specific session of operation of the specific MFP 200. For example, this coded identification information can comprise a printer identifier (PID) for the specific MFP 200, such as a printer serial number or other printer identifier, and also a randomly generated session identifier (SID), such as a randomly generated session number, that is assigned by the specific MFP 200 to the specific session of operation. Techniques for generating such codes are well known in the art and, thus, the details are omitted from this specification in order to allow the reader to focus on the salient aspects of the disclosed system, devices and methods.

It should be noted that this session prepayment code 215 can be generated by the specific MFP 200 or, alternatively, by the server 400 (as discussed in greater detail below).

The method of operating the system 100 can further comprise opening, by the specific user on a mobile device 300, the second application 321 operating on the mobile device 300 and, particularly, an application for effecting point-of-sale (POS) payment of services and entering the session prepayment code, which is displayed on the specific MFP 200, into the mobile device 300. Entering the session prepayment code into the mobile device 300 can be accomplished using a variety of different techniques, depending upon the type of session prepayment code displayed. For example, if the session prepayment code comprises an image code (e.g., a matrix barcode, a simple barcode, etc.), the mobile device 300 can be placed by the user such that it is adjacent to the GUI 211 of the specific MFP 200 and such that the camera 340 on the mobile device 300 is in an appropriate position to scan in the session prepayment code, which as mentioned above is displayed on GUI 211 of the specific MFP 200. The user can then initiate a scan in process through the GUI 311 on the mobile device 300. However, if the session prepayment code comprises an alphanumeric code or other type of character string code, the user can visually read the session prepayment code off of the GUI 211 of the specific MFP 200 and can manually key it into the mobile device 300 using the GUI 311 of the mobile device 300. Alternatively, a short-range wireless communication link (e.g., a radio frequency identification (RFID) communication link, Bluetooth® communication link or a near-field communication (NFC) link) could be established between the mobile device 300 and the specific MFP 200 in order to allow the session prepayment code to be transmitted directly from the specific MFP 200 to the mobile device 300. Such short-range wireless communication links are well known in the art and, thus, the details are omitted from this specification in order to allow the reader to focus on the salient aspects of the disclosed system, devices and methods. In response to receiving the session prepayment code, the second application 321 can cause the mobile device 300 to automatically transmit that session prepayment code to the management and accounting server 400 (502).

The method of operating the management and accounting server 400 within the system 100 and, thereby the method of operating the system 100 can further comprise receiving the session prepayment code from the mobile device 300. In response to receiving the session prepayment code from the mobile device 300, the third application 421 operating on the server 400 can cause the server 400 to use the session prepayment code to access a function-cost menu 492 for the specific MFP 200, which is stored in the MFP database 422 (503). The function-cost menu 492 for the specific MFP 200 can list the available document management and production functions of the specific MFP (also referred to herein as the printer options (PO)) and the associated costs for those functions (also referred to herein as the printer prices (PP)). For example, the function cost-menu can list scan functions, print functions, facsimile (FAX) functions, copy functions, document storage functions, and electronic mail (e-mail) functions and can further list a detailed breakdown of costs for feature selections within those listed functions. For example, for a print function, the function-cost menu can specify different costs (e.g., cost/page) for single-side or double-sided print, black ink only or color ink, print quality (e.g., from fast draft to high quality), stapling, page sizes, page colors, etc.). Thus, the function-cost menu 492 is a price list for using the specific MFP 200. After the function-cost menu 492 for the specific MFP 200 is accessed, the third application 421 can cause the server 400 to automatically transmit it to the mobile device 300 (504). It should be noted that, optionally, for security purposes, encryption techniques can be used for communications between the server 400 and the mobile device 300 as well as for subsequent communications between the server 400 and the specific MFP 200.

More specifically, the server 400 can have a pair of public key infrastructure (PKI) keys and the public key of the server 400 can also exist in the application on the mobile device 300. At processes (503)-(504), the server 400 can receive the session prepayment code from the mobile device 300 and the third application 421 can cause the server 400 to decrypt that session prepayment code to obtain the identification information (e.g., the printer identifier (PID)) for the specific MFP 200 and for the specific session. The third application 421 can further cause the server 400 to verify the printer identifier (PID) against the list of registered MFPs 491 stored in the MFP database 422.

Once the specific MFP 200 is verified as a registered MFP, the third application 421 can cause the server 400 to generate a random user identifier (UID) for the specific user and to create a certificate (cert.) by grouping the user identifier (UID), the printer identifier (PID) and, optionally, an expiration time period (also referred to herein as an expiry date (ExpDate)) for the certification. The expiration time period can, for example, be preset at 10 minutes, 15 minutes, or any other suitable expiration time period. The third application 421 can subsequently cause the server 400 to sign the certification with a private key and to encrypt the certification along with its signature using the public key to generate an encrypted certification (cert').

Using the printer identifier (PID), the third application 421 can also cause the server 400 to access the function-cost menu 492 for the specific MFP 200 from the MFP database 422. As mentioned above, this function-cost menu 492 indicates the functions available on the MFP 200 and associated costs for those functions. The third application 421 can cause the server 400 to sign the function-cost menu 492 with its private key so that the mobile device 300 is given assurance that the function-cost menu 492 is coming from server 400. Then, the third application 421 can cause the server 400 to transmit the encrypted certification (cert'), the private key and the function-cost menu 492 to the mobile device 300. Additionally, the third application 421 can cause the server 400 to generate and save, in the use authorization and accounting database 423, a preliminary session record 482 that associates the user identifier (UID) for the specific user during a specific session, the printer identifier (PID) for the specific MFP and, if applicable, the expiration time period (ExpDate) for the certification.

The method of operating the mobile device 300 within the system 100 and, thereby the method of operating the system 100 can further comprise receiving the function-cost menu 492 from the server 400. In response to receiving the function-cost menu 492 from the server 400, the second application 321 can cause the mobile device 300 to display that function-cost menu 492 on the GUI 311 in order to allow the user to estimate the overall cost for the specific session of operation of the MFP 200 and, thereby the amount required for prepayment for the specific session (505). The mobile device 300 can further communicate with a payment service 101 to allow the user to process prepayment for the specific service (506). Specifically, the second application 321 can allow the user to access the payment service 101 to effect payment for the specific session of the MFP 200 (506). The payment service 101 can comprise, for example, an e-commerce business, such as PayPal, that allows payments to be made through the Internet. Alternatively, the payment service 101 can comprise a credit card processing service or any other suitable payment service.

More specifically, at processes (505)-(507), the mobile device 300 can receive the encrypted certification (cert.'), the private key and the function-cost menu 492 for the specific MFP 200 from the server 400 and, in response, the second application 321 can cause the mobile device 300 to verify the private key using the public key of the server 400. Following verification of the private key, the second application 321 can cause the mobile device 300 to display the function-cost menu 492 for the specific MFP 200 on the GUI 311, thereby allowing the user to view that menu. Using the function-cost menu 492 for the specific MFP 200, the user can estimate the overall cost for the desired services during the specific session of operation of the MFP 200 and, thereby the amount required for prepayment for the specific session. Using the mobile device 300, the user can communicate with the payment service 101 for processing the prepayment amount. Proof of prepayment (PayInfo) (e.g., a receipt) can be received by the mobile device 300 from the payment service 101 and this proof of prepayment (PayInfo) can be transmitted from the mobile device 300 to the server 400 (507). For security purposes, the proof of prepayment (PayInfo) can be encrypted prior to transmission to the server 400 at process 507. For example, the mobile device 300 can receive the proof of prepayment (PayInfo) from the payment service 101 and the second application 321 can cause the mobile device 300 to encrypt that proof of payment (PayInfo) with the server's public key to generate an encrypted proof of prepayment (PayInfo') and to transmit the encrypted certification (cert') along with the encrypted proof of prepayment (PayInfo') to the server 400.

The method of operating the server 400 within the system 100 and, thereby the method of operating the system 100 can further comprise receiving the proof of prepayment (PayInfo) from the mobile device 300. In response to receiving that proof of prepayment (PayInfor), the third application 421 can cause the server 400 to verify the proof of prepayment with the payment service 101 (508). After the proof of payment is received and verified, the third application 421 can cause the server 400 to generate a credit record 481 associating a value of available credit with a specific user (e.g., using the user identifier (UID)) and to save that credit record 481 in the management and accounting database 423. Additionally, the third application 421 can cause the server 400 to generate a use authorization (UA) code and to transmit that use authorization (UA) code to the mobile device 300 (509)-(510). For security purposes, the third application 421 can cause the server to transmit the use authorization (UA) code to the mobile device 300 along with an encrypted updated certification (updated cert.').

More specifically, when the proof of prepayment (PayInfo) transmitted to the server 400 is encrypted, the server 400 can receive the encrypted certification (cert.') and the encrypted proof of prepayment (PayInfo'). In response, the third application 421 can cause the server 400 to decrypt the encrypted certification (cert.'), verify the signature and further verify the existence, in the use authorization and accounting database 423, of a preliminary session record 482 that associates the user identifier (UID), the printer identifier (PID) and, if applicable, the expiration time period (ExpDate) for the certification (cert.).

If the existence of such a preliminary session record 482 is verified, the third application 421 can cause the server 400 to decrypt the encrypted proof of prepayment (PayInfo') and to verify the authenticity of the payment made with the payment service 101. If the payment is authenticated, the third application 421 can cause the server 400 to generate and save, in the management and accounting database 423, a credit record 481 associating a value of available credit with the specific user (e.g., using the user identifier (UID)). It should be understood that the value of available credit will correspond to the amount prepaid by the specific user for the specific session.

Additionally, the third application 421 can cause the server 400 to generate a mobile device-specific random session identifier (MSessionID) and to generate an updated certification (updated cert.) by grouping the user identifier (UID), the printer identifier (PID) and the mobile device-specific random session identifier (MSessionID) and a second expiration time period (also referred to herein as a second expiry date (ExpDate2)) for the use authorization code. The second expiration time period can limit the specific session to a specific time period and can, for example, be preset at 30 minutes, 60 minutes, or any other suitable expiration time period. The third application 421 can further cause the server 400 to sign the updated certification (updated cert.) with the private key and to encrypt the updated certification (updated cert.) and the signature with its public key to generate an encrypted updated certification (updated cert.'). The third application 421 can then cause the server 400 to generate the use authorization (UA) code in, for example, the form of a random personal identification number (PIN) for the specific session of operation of the specific MFP 200 and to transmit the use authorization (UA) code (e.g., the personal identification number (PIN)) and the encrypted updated certification (updated cert.') to the mobile device 300.

The third application 421 can also cause the server 400 to hash the use authorization (UA) code (e.g., the personal identification number (PIN)) in order to generate a hashed use authorization code and can cause the server 400 to generate and save, in the use authorization and accounting database 423, a final session record 483, which associates the hashed use authorization (UA) code, the mobile device-specific random session identifier (MSessionID), the user identifier (UID), the printer identifier (PID) and the second expiration time period (ExpDate2) for the use authorization (UA) code.

The method of operating the mobile device 300 within the system 100 and, thereby the method of operating the system 100 can further comprise receiving the use authorization (UA) code (e.g., the personal identification number (PIN)) from the server 400. In response to receiving the use authorization (UA) code from the server 400, the second application 321 can cause the mobile device 300 to display that use authorization (UA) code on the GUI 311 for use by the specific user (511). For example, the use authorization (UA) code can comprise a human-readable use authorization (UA) code and upon receiving this human-readable use authorization (UA) code, the specific user can read and manually input (e.g., key in) the use authorization code into the specific MFP 200 in response to the use authorization code input prompt 216 displayed on the GUI 211 of the MFP 200. Alternatively, a short-range wireless communication link could be established between the mobile device 300 and the specific MFP 200 in order to allow the use authorization code to be transmitted directly from the mobile device 300 to the specific MFP 200. It should be noted that the encrypted updated certification (updated cert.') can also be received by the mobile device 300 from the server 400.

The method of operating the specific MFP 200 within the system 100 and, thereby the method of operating the system 100 can further comprise receiving the use authorization (UA) code from the specific user (512). For example, the specific user can manually key in the use authorization (UA) code into a field presented by the use authorization code input prompt 216 on the GUI 211 of the specific MFP 200. Alternatively, as mentioned above, the use authorization (UA) code can be communicated from the mobile device 300 to the specific MFP 200 using a short-range wireless communication link. In any case, the use authorization (UA) code will indicate to the specific MFP 200 that the specific user has prepaid for the specific session of operation of the specific MFP 200 and is, thereby authorized to use the specific MFP 200. In response to receiving the use authorization (UA) code, the first application 221 can cause the specific MFP 200 to communicate with the management and accounting server 400 in order to verify the validity of the use authorization (UA) code and determine the value of available credit associated with the use authorization (UA) code and, particularly, the value of available credit associated the specific user for the specific session of operation of the specific MFP 200 (513). For example, the first application 221 can cause the specific MFP 200 to hash the use authorization (UA) code (e.g., can hash the personal identification number (PIN)) and to transmit the results along with the printer identifier (PID) for the specific MFP 200 to the server 400.

The method of operating the server 400 within the system 100 and, thereby the method of operating the system 100 can further comprise receiving, from the specific MFP 200, a request to verify the validity of the use authorization (UA) code and to determine the value of available credit associated with that use authorization (UA). As mentioned above, this request can be in the form of a hashed use authorization (UA) code accompanied by the printer identifier (PID) for the specific MFP 200. In response to this request from the MFP 200, the third application 421 can cause the server 400 to use the use authorization and accounting database 423 and particularly, the final session records 483 and the available credit records 481 stored therein, to verify the use authorization (UA) code and determine the value of available credit associated with the use authorization (UA) code (514).

More specifically, the third application 421 can cause the server 400 to access the final session records 483 stored in the use authorization and accounting database 423 and to determine whether the use authorization (UA) code (e.g., the personal identification number (PIN)) is associated with that specific MFP 200, using the printer identifier (PID) for the specific MFP 200. If so, the validity of the use authorization (UA) code is verified. Additionally, the third application 421 can cause the server 400 to acquire the user identifier (UID) for the specific user, when accessing the final session records 483. Once the user identifier (UID) is acquired, the third application 421 can cause the server 400 to access the credit records 481 stored in the use authorization and accounting database 423 and to determine the value of available credit the specific user has for the specific session of operation of the specific MFP 200, using the user identifier (UID).

The third application 421 can then cause the server 400 to generate a random printer-specific session identifier (PSessionID) and to create an additional certificate (additional cert.) by grouping the user identifier (UID), the printer identifier (PID), the printer-specific session identifier and the second expiration time period (also referred to herein as a second expiry date (ExpDate2)) for the use authorization code. The third application 421 can further cause the server 400 to sign the additional certification (additional cert.) with its private key and to encrypt the additional certification (additional cert.) together with its signature with its public key to generate an encrypted additional certification (encrypted additional cert.'). The third application 421 can then cause the server 400 to transmit, to the specific MFP 200, the encrypted additional certification (encrypted additional cert') and the value of the available credit that the specific user has for the specific session of operation of that specific MPF 200.

The third application 421 can also cause the server 400 to add the printer-specific session identifier (PSessionID) to the final session record 483, which is stored in the use authorization and accounting database 423 and which is associated with user identifier (UID) for the specific user and the printer identifier (PID) for the specific MFP 200.

The method of operating the specific MFP 200 within the system 100 and, thereby the method of operating the system 100 can further comprise receiving, from the server 400, verification of the validity of the use authorization (UA) code and the value of available credit associated with that use authorization (UA) and, particularly, the value of available credit associated with the specific user for the specific session of operation of the specific MFP 200. Once this information is received, the first application 221 can cause the MFP 200 to unlock for use by the specific user. That is, the first application 221 can cause the MFP 200 to display on its GUI 211 a menu of selectable functions and, particularly, selectable document management and production functions, available on the specific MFP 200 and the available credit the user has for the specific session (515). This allows the MFP 200 to receive a selection for a specific function of the selectable functions on that menu from the specific user through the GUI 211 (516). As mentioned above, the document management and production functions can include, but are not limited to, scan functions, print functions, facsimile (FAX) functions, copy functions, document storage functions, and electronic mail (e-mail) functions.

More specifically, the specific MFP 200 can receive the encrypted additional certification (additional cert.') and an indication of the value of available credit the user has for the specific session. In response to receiving the encrypted additional certification (additional cert.') and the value of available credit, the first application 221 can cause the specific MFP 200 to set the current operating session of the specific MFP 200 to the encrypted additional certification (additional cert.') and the printer identifier (PID), to unlock the functions of the specific MFP 200 and to display a menu that allows the specific user to select a specific function (e.g., a scan function, a print function, a facsimile (FAX) function, a copy function, a document storage function, or an electronic mail (e-mail) function). It should be noted that in addition to cause the MFP 200 to display the menu of selectable functions on the GUI 211, the first application 221 can also cause the MFP 200 to display, on the GUI 211, a detailed breakdown of the costs associated with those functions and the value of available credit that the specific user has for the specific session of operation of the specific MFP 200.

In response to receiving a selection by a user of a specific function, the first application 221 can cause the MFP 200 to communicate with the server 400 in order to verify that the specific user currently has authorization to use the specific MFP 200 and to determine whether the user has sufficient credit available to cover the cost of performing the specific function selected (517).

The method of operating the server 400 within the system 100 and, thereby the method of operating the system 100 can further comprise receiving, from the specific MFP 200, a request to verify that the specific user currently has authorization to use the specific MFP 200 and to determine whether the user has sufficient credit available to cover the cost of performing the specific function selected and responding to that request (518).

More specifically, in response to a selection made by a specific user from a menu of selectable functions at process 516, the first application 221 can cause the specific MFP 200 to communicate with the server 400 to determine whether the specific user currently has authorization to use the specific MFP 200 and, if so, whether the specific user has sufficient credit available to cover the cost of performing the specific function selected. For example, the first application 221 can cause the specific MFP 200 to read the session data and to send the encrypted additional certification (additional cert.') together with the printer identifier (PID) to the server 400. In response, the third application 421 can cause the server 400 to authenticate that the specific user currently has authorization to use the specific MFP 200 by first decrypting the encrypted additional certification (additional cert.') and verifying the signature. The third application 421 can further cause the server 400 to access the use authorization and accounting database 423 to verify the existence of a final session record 483 that associates the printer identifier (PID) and user identifier (UID), to determine whether or not an expiration period for the use authorization (UA) code (i.e., the second expiration period (ExpDate2)) has expired and to verify the printer-specific session identifier (PSessionID). The third application 421 can also cause the server 400 to access the function-cost menu 492 for the specific MFP 200 using the printer identifier (PID) to calculate how much credit is required for the specific function selected and to access the credit record 481 associated with the specific user using the user identifier (UID). The third application 421 can then cause the server 400 to compare the cost for the specific function selected to the user's available credit in order to determine whether or not the specific user has enough credit available to cover that cost. Following this comparison process, the third application 421 can cause the server 400 to respond to the specific MFP 200. For example, the third application 421 can cause the server 400 to transmit a "release job" command when the specific user has enough credit available and a "delete job" command when the specific user does not have enough credit available.

The method of operating the specific MFP 200 within the system 100 and, thereby the method of operating the system 100 can further comprise receiving the response from the server 400. In response, the first application 221 can, when the specific user currently has use authorization for the specific MFP 200 and when the value of the available credit is at least as high as the specific cost, cause the MFP 200 to allow the functional component(s) 240 thereof to perform the specific function (519). Additionally, the first application 221 can cause the specific MFP 200 to report out the performance of the specific function to the server 400 (e.g., to send a report to the server 400 with the encrypted additional certification (additional cert.'), the printer identifier (PID) for the specific MFP 200 and the details of the completed function) (520).

The method of operating the server 400 within the system 100 and, thereby the method of operating the system 100 can further comprise receiving, from the specific MFP 200, the report of performance of specific function(s) during the specific session. In response to the report, the third application 421 can cause the server 400 to deduct any specific cost(s) associated with the specific function(s) from the value of the available credit indicated on the credit record 481 associated with the specific user within the use authorization and accounting database 423 (521). For example, the third application 421 can cause the server 400 to authenticate the specific user by validating the encrypted additional certification (additional cert.'), to use the details of the completed function to calculate the actual cost of the completed function, to debit that cost from the available credit associated with the specific user and to update the available credit amount shown in the available credit record 481 associated with the specific user, and to report out the updated available credit amount to the specific MFP 200 for display on the GUI 211. It should be noted that, even if the specific user currently has use authorization for the specific MFP 200, when the value of available credit is less than the specific cost associated with the specific function, the first application 221 will ensure that the functional component(s) 240 of the specific MFP 200 are prohibited from performing the specific function. In this case, the first application 221 can cause the MFP 200 to delete the selected function (i.e., the job) and to display a notice of deletion due to lack of available credit on the GUI 211 of the specific MFP 200.

It should be noted that in the method of operating the specific MFP 200 in the system 100 and, thereby in the method of operating the system 100, the specific user can be allowed by the first application 221 to select specific ones of the selectable functions on the menu of selectable functions displayed on the GUI 211 until the specific session of operation of the specific MFP 200 is terminated. Termination of the specific session can occur when the specific user terminates the specific session, when a time period allotted for the specific session ends (e.g., when the second expiration period (ExpDate2) expires) or when all available credit is used, whichever comes first (522).

Following termination of the specification session at process 522 as described above, the first application 221 can cause the MFP 200 to report out a notice of session termination to the server 400. Optionally, also following termination of the specific session, the first application 221 can cause the MFP 200 to display, on the GUI 211, an option to submit a refund request, when any credit remains available. Alternatively, the second application 321 operating on the mobile device 300 can cause the mobile device 300 to display such an option on its GUI 311. In any case, a refund request when submitted by the specific user through the specific MFP 200 or the mobile device 300 can be communicated, by the specific MFP 200 or mobile device 300, as applicable, to the server 400, for processing (523). For example, the first application 221 operating on the specific MFP 200 can cause the specific MFP 200 to submit a refund request together with the encrypted additional certification (additional cert.') and the printer identifier (PID) to the server 400. Alternatively, the second application 321 operating on the mobile device 300 can cause the mobile device 300 to submit a refund request together with the encrypted certification (cert') to the server 400.

The method of operating the server 400 within the system 100 and, thereby the method of operating the system 100 can further comprise receiving the notice of termination of the specific session from the specific MFP 200. In response to receiving the notice of termination, the third application 421 can cause the server to prepare and transmit a receipt for the specific session to the mobile device 300. Additionally, when any credit remains available following termination of the specific session and a refund request is submitted by the specific user, that refund request can be received, by the server 400, from either the specific MFP 200 or the mobile device 300, as applicable. In response to receiving a refund request, the third application 421 can cause the server 400 to process that refund request in order to ensure that the specific user receives a refund (e.g., from the payment service 101) (524). For example, the third application 421 can cause the server 400 to receive the encrypted additional certification (additional cert.') from the specific MFP 200 or the encrypted certification (cert.') from the mobile device, to decrypt it, to use the authorization and accounting database 423 to determine the existence of a final session record 483 that associates the printer identifier (PID) and user identifier (UID), to verify the second expiration period (ExpDate2), and to verify the printer-specific session identifier (PSessionID) for the specific MFP 200 or the mobile device-specific session identifier (MSessionID) for the mobile device 300, as appropriate. The third application 421 can further cause the server 400 to access the credit record 481 associated with the specific user using the user identifier (UID), to verify whether or not the user has any remaining credit available and, if so, to access the proof of prepayment (PayInfo) and communicate with the payment service 101 to request a refund be provided to the specific user. Following processing of the refund request, the third application 421 can cause the server 400 to set the value of the available credit shown in the credit record 481 associated with the user identifier (UID) to zero. It should be noted that various protections can be in place to ensure that the server 400 does not process multiple refund requests, when such requests are received via both the specific MFP 200 and the mobile device 300.

As mentioned above, the session prepayment code that is displayed on the GUI 211 of the specific MFP 200 in response to a session initiation input from the user contains coded information and, particularly, coded identification information for both the specific MFP 200 and the user-initiated specific session of operation of the specific MFP. Each session prepayment code can be generated for each specific session of operation by the specific MFP 200 or, alternatively, by the server 400. For example, the first application 221 can cause the specific MFP 200 to automatically generate a new session prepayment code each time a specific session of operation of the specific MFP 200 is terminated or each time a session initiation input is received. Alternatively, the third application 421 can cause the server 400 to generate a new session prepayment code and to transmit that new session prepayment code to the specific MFP 200 each time a specific session of operation for the specific MFP 200 is terminated.

Figure 7:
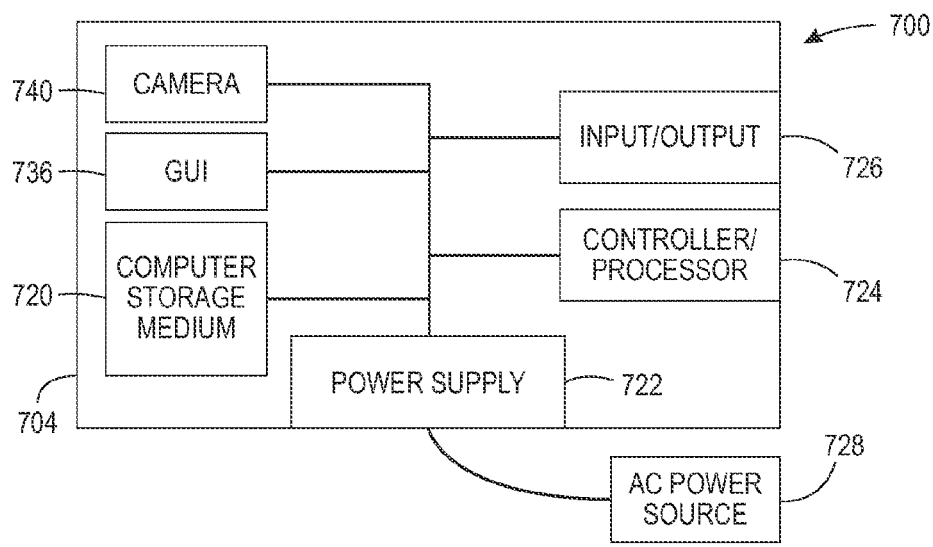
FIG. 7 is a schematic diagram illustrating a hardware configuration for a computerized mobile device; and, FIG. 8 is a schematic diagram illustrating a hardware configuration for a computerized printing device.

FIG. 7 illustrates an exemplary computerized mobile device 700, which can be incorporated into the system 100 of FIG. 1 as the mobile device 300 and which can be used to implement the methods described above. This computer mobile device 700 can comprise at least a housing 704 and, contained within the housing 704, multiple functional components including, but not limited to, a controller/processor 724, a communications port (i.e., an input/output device) 726, and a memory (e.g., including, but not limited to, a non-transitory computer-readable storage medium 720) operatively connected (e.g., over a system bus). The computerized mobile device 700 can further comprise at least one accessory functional component, such as a camera 740 and a display screen 736 for displaying graphic user interfaces for applications executed on the computerized mobile device 700, in communication with the processor 724 (e.g., over the system bus). Optionally, the multiple functional components, including any accessory functional components, can operate on power supplied from an alternating current (AC) source 728 via an internal power supply 722. This internal power supply 722 can comprise a rechargeable power storage element (e.g., a rechargeable battery, etc.).

The communications port (i.e., the input/output device) 726 can be used for communications between the computerized mobile device and other computerized devices, such as a server, over a wireless telecommunication network, such as 3G or 4G wireless telecommunication network or a local area telecommunication network. Optionally, the communications port (i.e., the input/output device) 726 can also be configured to provide a short-range wireless communication link (e.g., a radio frequency identification (RFID) communication link, Bluetooth® communication link or a near-field communication (NFC) link) between the computerized mobile device 700 and other computerized devices (e.g., a multi-function printer (MFP)). The controller/processor 724 can control the various actions of the computerized mobile device 700. The non-transitory computer-readable storage medium 720 can comprise, for example, an optical storage device, a magnetic storage device, a capacitor-based storage device or any other suitable computer-readable storage device. This computer-readable storage device can be readable by the controller/processor 724 and can store programs of instructions (e.g., applications) that the controller/processor 724 can execute to allow the computerized mobile device 700 to perform its various functions and, particularly, the method steps discussed in detail above.

Figure 8:
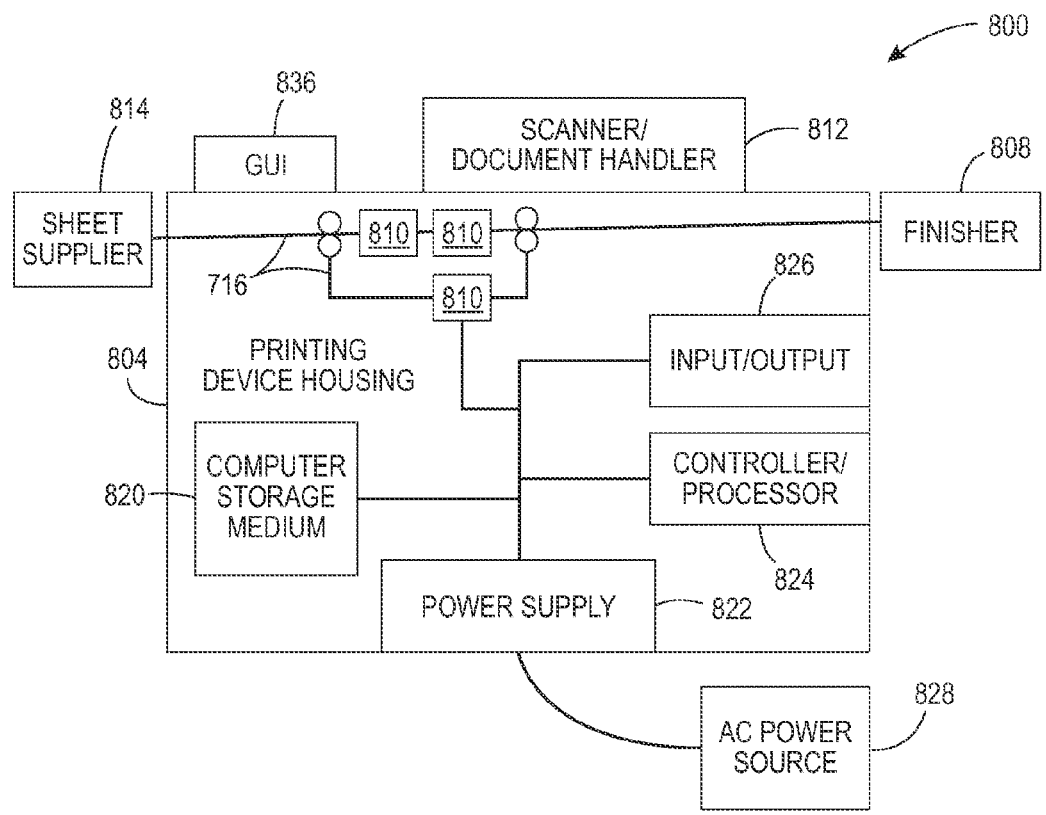

FIG. 8 illustrates an exemplary computerized printing device 800, which can be incorporated into the document authentication system 100 of FIG. 1 as a multi-function printer (MFP) 200 and which can be used to implement the methods described above. The printing device 800 can comprise a housing 804 and, contained within the housing 804, multiple functional components including, but not limited to, a controller/processor 824, a communications port (i.e., an input/output device) 826, a memory (including, but not limited to, a non-transitory computer-readable storage medium 820), at least one print media path 816, and at least one print engine 810 (i.e., at least one marking device) operatively connected (e.g., over a system bus). The printing device 800 can further comprise multiple accessory functional components, such as a display screen 836 for displaying a graphic user interface (GUI) for programs executed on the printing device 800, a sheet suppler 814, a document finisher 808 and a document handler 812, in communication with the controller/processor 824 (e.g., over the system bus). The multiple functional components, including any accessory functional components, can operate on power supplied from an alternating current (AC) source 828 via an internal power supply 822. This internal power supply 822 can comprise a power storage element (e.g., a battery, etc.).

The communications port (i.e., the input/output device) 826 can be used for communications between the printing device 800 and other computerized devices, such as a server, over a wireless telecommunication network, such as 3G or 4G wireless telecommunication network or a local area telecommunication network. Optionally, the communications port (i.e., the input/output device) 826 can also be configured to provide a short-range wireless communication link (e.g., a radio frequency identification (RFID) communication link, Bluetooth® communication link or a near-field communication (NFC) link) between the printing device 800 and other computerized devices (e.g., a mobile device). The controller/processor 824 can control the various actions of the printing device 800. The non-transitory computer-readable storage medium 820 can comprise, for example, an optical storage device, a magnetic storage device, a capacitor-based storage device or any other suitable computer-readable storage device. This computer-readable storage device can be readable by the controller/processor 824 and can store instructions that the controller/processor 824 can execute to allow the printing device 800 to perform its various functions. The media path(s) 816 can be positioned to transport sheets of media from the sheet supplier 814 through the print engine(s) 810, as controlled by the controller/processor 824. After receiving various markings from the printing engine(s) 810, the sheets of media can be transmitted to an output tray (not shown) or, optionally, to the finisher 808, which can fold, staple, sort, etc., the various printed sheets.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

Therefore, disclosed above is a system that incorporates a self-service multi-function printer (MFP), a mobile device (e.g., a smartphone) and a management and accounting server in communication with both the MFP and the mobile device in order to effect point of sale (POS) payment of services provided to a user by the MFP. In the disclosed system, a MFP displays a session prepayment code (e.g., a matrix barcode or other image code or an alphanumeric code) that contains coded identification information for both the MFP and the user-initiated specific session of operation of the MFP. The user can enter the code into the mobile device (e.g., by scanning it in using a camera of the mobile device or manually keying it in, as appropriate) and can transmit it to the server using the mobile device. Based on the code, the server can transmit a menu of MFP functions and associated costs back to the mobile device so that the user can estimate the cost of and prepay for the specific session, using an online payment service that is accessible through the mobile device. Once the server receives proof of prepayment from the user using the mobile device, the server can generate and transmit a use authorization code to the mobile device and this code can be input by the user into the MFP. The MFP can communicate with the server to verify the validity of the use authorization code and can perform user-selected functions until the user terminates the specific session, until a time period allotted for the specific session ends or until all available credit is used, whichever comes first. Optionally, to enhance security, communications between the various system components can be encrypted. Using the mobile device to effect the POS payment for the services in this manner is advantageous because it eliminates the need for the presence of a clerk to process the POS payment or additional hardware for specific payment systems. Also disclosed above are the unique components used to implement such a system (e.g., a MFP, a mobile device and a management and accounting server) and the methods of operating those components in an integrated manner and, thereby a method of operating the system as a whole.

What is claimed is:

1. A system comprising:
    a first application operating on a printer;
    a second application operating on a mobile device of a user that is separate from said printer, said mobile device comprising a smartphone; and,
    a third application operating on a server that is separate from said printer and said mobile device,
    said first application causing said printer to generate, in response to a session initiation input by said user, a session prepayment code containing coded identification information for both said printer and a specific session of operation of said printer by said user,
    said first application further causing said printer to perform at least one of the following: display said session prepayment code for capture by a camera of said mobile device and wirelessly transmit said session prepayment code to said mobile device, said coded identification information comprising a printer identification number and a session number,
    said mobile device receiving said session prepayment code and, in response, said second application causing said mobile device to communicate said session prepayment code to said server over a network,
    said server receiving said session prepayment code from said mobile device and, in response, said third application causing said server to use said session prepayment code to access a function-cost menu listing functions of said printer and costs for said functions and further causing said server to communicate said function-cost menu to said mobile device over said network,
    said mobile device receiving said function-cost menu from said server and, in response, said second application causing said mobile device to display said function-cost menu,
    said function-cost menu being displayed on said mobile device so as to allow said user to estimate an amount required for prepayment for said specific session,
    said second application allowing said user to effect said prepayment using an on-line payment service and further causing said mobile device to communicate proof of said prepayment to said server,
    said server receiving said proof of said prepayment from said mobile device and, in response, said third application causing said server to generate a use authorization code for said specific session of operation of said printer by said user and to communicate said use authorization code to said mobile device,
    said mobile device receiving said use authorization code from said server and, in response, said second application causing said mobile device to perform any of the following:
        display said use authorization code so as to allow said user to read said use authorization code and to manually enter said use authorization code into said printer; and,
        wirelessly communicate said use authorization code to said printer, and
    said printer receiving said use authorization code and, in response, said first application allowing said printer to be used by said user during said specific session and terminating use of said printer by said user when any one of the following occurs: a specific time allotted for said specific session expires; and, fees incurred for specific functions that are selected manually on said printer by said user and performed by said printer during said specific session exceed a value of available credit associated with said use authorization code.

2. The system of claim 1, said use authorization code indicating said prepayment by said user for said specific session using said session prepayment code and said first application causing said printer to perform the following during said specific session:
    communicate with said server in order to verify a validity of said use authorization code and to determine said value of available credit associated with said use authorization code,
    display a menu of selectable functions of said printer, and
    perform a specific function selected by said user from said menu of said selectable functions, when said value of said available credit is at least as high as a specific cost associated with said specific function.

3. The system of claim 2, said first application further causing said printer to prohibit performance of said specific function, when said value of said available credit is less than said specific cost associated with said specific function.

4. The system of claim 1, said session prepayment code comprising any one of a machine-readable image code and an alphanumeric code that is newly generated.

5. A method comprising:
    causing a printer to generate, in response to a session initiation input by a user, a session prepayment code containing coded identification information for both said printer and a specific session of operation of said printer by said user, said coded identification information comprising a printer identification number and a session number;

causing said printer to perform at least one of the following: display said session prepayment code for capture by a camera of a mobile device of said user and wirelessly transmit said session prepayment code to said mobile device, said mobile device comprising a smartphone;

causing said mobile device of said user, which is separate from said printer and which receives said session prepayment code, to communicate said session prepayment code to a server over a network, said server being separate from said printer and said mobile device;

causing said server to use said session prepayment code to access a function-cost menu listing functions of said printer and costs for said functions;

causing said server to communicate said function-cost menu to said mobile device over said network; and, causing said mobile device to display said function-cost menu, said function-cost menu being displayed on said mobile device so as to allow said user to estimate an amount required for prepayment for said specific session, and said method further comprising:

allowing said user to effect said prepayment for said specific session using an on-line payment service accessible through said mobile device;

causing said mobile device to communicate proof of said prepayment to said server;

causing said server to generate, in response to said proof of said prepayment, a use authorization code for said specific session of operation of said printer by said user and to communicate said use authorization code to said mobile device;

causing said mobile device to perform any of the following:
  display said use authorization code so as to allow said user to read said use authorization code and to manually enter said use authorization code into said printer; and,
  wirelessly communicate said use authorization code to said printer; and, in response to receiving said use authorization code, allowing said printer to be used by said user during said specific session and terminating use of said printer by said user when any of the following occur: a specific time allotted for said specific session expires; and fees incurred for specific functions that are selected manually on said printer by said user and performed by said printer during said specific session exceed a value of available credit associated with said use authorization code.

6. The method of claim 5, said use authorization code indicating prepayment by said user for said specific session using said session prepayment code and said method further comprising causing said printer to perform the following during said specific session:

communicate with said server in order to verify a validity of said use authorization code and to determine said value of available credit associated with said use authorization code, display a menu of selectable functions of said printer, and perform a specific function selected by said user from said menu of said selectable functions, when said value of said available credit is at least as high as a specific cost associated with said specific function.

7. The method of claim 6, further comprising causing said printer to prohibit performance of said specific function, when said value of said available credit is less than said specific cost associated with said specific function.

8. The method of claim 5, said session prepayment code comprising any one of a machine-readable image code and an alphanumeric code, which is newly generated.

9. A system comprising:

a first application operating on a printer;

a second application operating on a mobile device of a user that is separate from said printer and that comprises a camera, said mobile device comprising a smartphone; and, a third application operating on a server that is separate from said printer and said mobile device, said first application causing said printer to display, in response to a session initiation input by said user, a session prepayment code containing coded identification information for both said printer and a specific session of operation of said printer by said user and said coded identification information comprising a printer serial number and a randomly generated session number, said session prepayment code being scanned into said mobile device by said user using said camera and, in response, said second application causing said mobile device to communicate said session prepayment code to said server over a network, said server receiving session prepayment code from said mobile device and, in response, said third application causing said server to use said session prepayment code to access a function-cost menu listing functions of said printer and costs for said functions and further causing said server to communicate said function-cost menu to said mobile device over said network, said mobile device receiving said function-cost menu from said server and, in response, said second application causing said mobile device to display said function-cost menu so as to allow said user to estimate an amount required for prepayment for said specific session in order to effect said prepayment using an on-line payment service accessible through said mobile device and said second application further causing said mobile device to communicate proof of said prepayment to said server over said network, said server receiving proof of said prepayment from said mobile device and, in response, said third application causing said server to generate a use authorization code for said specific session of operation of said printer by said user and to communicate said use authorization code to said mobile device over said network, said mobile device receiving said use authorization code from said server and, in response, said second application causing said mobile device to display said use authorization code so as to allow said user to read said use authorization code and to manually enter said use authorization code into said printer, said printer receiving said use authorization code from said user and, in response, said first application allowing said printer to be used by said user during said specific session and terminating use of said printer by said user when any of the following occur: a specific time allotted for said specific session expires; and, fees incurred for specific functions that are selected manually on said printer by said user and performed by said printer during said specific session exceed a value of available credit associated with said use authorization code, said use authorization code indicating prepayment by said user for said specific session using said session prepayment code and said first application causing said printer to perform the following during said specific session:
- communicate with said server in order to verify a validity of said use authorization code and to determine said value of available credit associated with said use authorization code,
- display a menu of selectable functions of said printer, and
- perform a specific function selected by said user from said menu of said selectable functions, when said value of said available credit is at least as high as a specific cost associated with said specific function.

10. The system of claim 9, said first application further causing said printer to prohibit performance of said specific function, when said value of said available credit is less than said specific cost associated with said specific function.

11. The system of claim 9, said session prepayment code comprising a matrix barcode, which is newly generated.

12. A method comprising:
causing a printer to generate, in response to a session initiation input by a user, a session prepayment code containing coded identification information for both said printer and a specific session of operation of said printer by a user and said coded identification information comprising a printer serial number and a randomly generated session number;
causing a mobile device of said user, which is separate from said printer, to communicate said session prepayment code over a network to a server that is separate from said printer and said mobile device, said mobile device comprising a smartphone and said session prepayment code being scanned into said mobile device by said user using a camera of said mobile device;
causing said server to use said session prepayment code to access a function-cost menu listing functions of said printer and costs for said functions;
causing said server to communicate said function-cost menu to said mobile device over said network,
causing said mobile device to display said function-cost menu in order to allow said user to estimate an amount required for prepayment for said specific session in order to effect said prepayment using an on-line payment service accessible through said mobile device;
causing said mobile device to communicate proof of said prepayment to said server over said network;
causing said server to generate a use authorization code for said specific session of operation of said printer by said user and to communicate said use authorization code to said mobile device over said network;
causing said mobile device to display said use authorization code so as to allow said user to read said use authorization code and to manually enter said use authorization code into said printer; and,
in response to receiving said use authorization code, allowing said printer to be used by said user during said specific session and terminating use of said printer by said user when any of the following occur: a specific time allotted for said specific session expires and fees incurred for specific functions that are selected manually on said printer by said user and performed by said printer during said specific session exceed a value of available credit associated with said use authorization code, said use authorization code indicating prepayment by said user for said specific session using said session prepayment code and said method further comprising causing said printer to perform the following during said specific session:
- communicate with said server in order to verify a validity of said use authorization code and to determine said value of available credit associated with said use authorization code,
- display a menu of selectable functions of said printer, and
- perform a specific function selected by said user from said menu of said selectable functions, when said value of said available credit is at least as high as a specific cost associated with said specific function.

13. The method of claim 12, said method further comprising causing said printer to prohibit performance of said specific function, when said value of said available credit is less than said specific cost associated with said specific function.

14. The method of claim 12, said session prepayment code comprising a matrix barcode, which is newly generated.

* * * * *